US010285336B2

(12) United States Patent
Chao

(10) Patent No.: US 10,285,336 B2
(45) Date of Patent: May 14, 2019

(54) PLANT CONTAINER ASSEMBLY WITH NESTED GROWTH SUBSTRATES

(71) Applicant: Formgardens, Inc., Seattle, WA (US)

(72) Inventor: Monika Chao, Seattle, WA (US)

(73) Assignee: Formgardens, Inc., Seattle, WA (US)

( * ) Notice: Subject to any disclaimer, the term of this patent is extended or adjusted under 35 U.S.C. 154(b) by 281 days.

(21) Appl. No.: 15/240,281

(22) Filed: Aug. 18, 2016

(65) Prior Publication Data

US 2018/0049375 A1 Feb. 22, 2018

(51) Int. Cl.
*A01G 9/029* (2018.01)
*A01G 25/02* (2006.01)
*A01G 9/02* (2018.01)

(52) U.S. Cl.
CPC ............ *A01G 9/0297* (2018.02); *A01G 9/025* (2013.01); *A01G 25/023* (2013.01); Y02P 60/244 (2015.11)

(58) Field of Classification Search
CPC .... A01G 9/0297; A01G 9/0295; A01G 9/028; A01G 9/023; A01G 9/025
See application file for complete search history.

(56) References Cited

U.S. PATENT DOCUMENTS

| 344,814 | A | * | 7/1886 | Carsley | A01G 9/104 47/73 |
|---|---|---|---|---|---|
| 695,484 | A | * | 3/1902 | Parker | A01G 9/0295 47/86 |
| 2,756,541 | A | * | 7/1956 | Berger | A01G 9/023 47/45 |
| 4,961,284 | A | * | 10/1990 | Williams | A01G 9/022 47/66.5 |
| 5,509,232 | A | * | 4/1996 | Laubsch | A01G 9/028 47/75 |
| 8,122,642 | B1 | * | 2/2012 | Huberman | C05F 11/08 47/59 S |
| 8,635,808 | B1 | * | 1/2014 | Anderson | A01G 9/028 47/66.1 |
| 9,210,846 | B2 | * | 12/2015 | VanLente | A01G 9/022 |
| 2007/0079553 | A1 | * | 4/2007 | Genma | A01G 9/02 47/85 |

FOREIGN PATENT DOCUMENTS

WO WO-2004054349 A1 * 7/2004 ............ A01G 9/028

* cited by examiner

*Primary Examiner* — Kristen C Hayes
(74) *Attorney, Agent, or Firm* — Perkins Coie LLP

(57) ABSTRACT

Plant container assemblies with nested growth substrates are disclosed herein. In one embodiment, a plant container assembly includes a base; an inner frame on the base; and an outer frame having a plurality of grid panels projecting from the base, surrounding the inner frame, and defining a plurality of slot regions between the inner frame and the grid panels. Growth substrates are inserted into the slot regions, and each of the growth substrates has a first side that is exposed through one of the grid panels for planting, and a second side that holds soil within a corresponding one of the slot regions.

19 Claims, 9 Drawing Sheets

PLANT CONTAINER ASSEMBLY WITH NESTED GROWTH SUBSTRATES

TECHNICAL FIELD

The following disclosure relates generally to plant container assemblies, and in particular to plant container assemblies having an open-grid frame structure.

BACKGROUND

Container gardening is the practice of growing plants in containers instead of planting them directly in the ground. Plant containers include large pots, flower pots, hanging baskets, window boxes, container gardens, and the like. Plant containers can be constructed from wood, ceramic, plastic, and many other materials.

Some plant containers have an outer layer formed from coir fibers. The coir fiber outer layer is a relatively thick structural layer. This layer can be formed into the shape of a bowl that holds soil in which the plants grow. The coir fibers help spread water and promote drainage for the plant material within the container. The plant material, however, generally initially take root within the soil, rather than the thick coir fiber layer.

DETAILED DESCRIPTION

Figure 1:
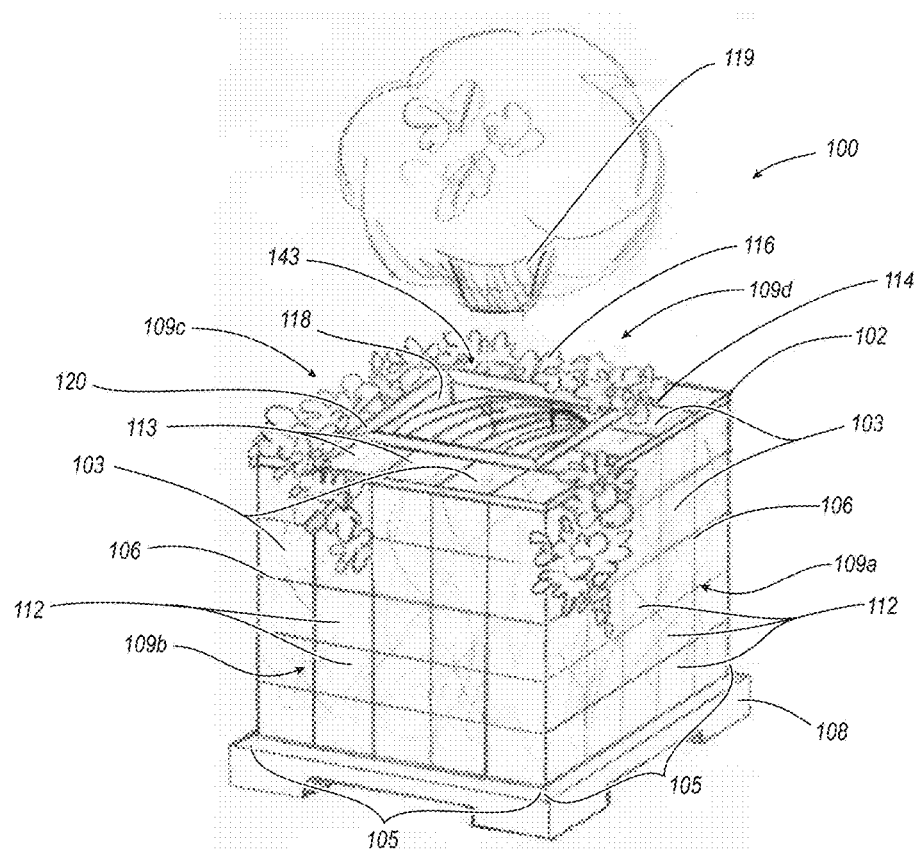
FIG. 1 is an isometric view of a plant container assembly configured in accordance with an embodiment of the present technology.

The following disclosure describes various embodiments of a plant container assembly with nested growth substrates. FIG. 1 shows one such embodiment of plant container assembly ("plant container 100") having an open-grid outer frame 102 and individual growth substrates 103 insertable and nested within the frame 102. The outer frame 102 includes grid panels 106 that project from a base region 108, such as a decorative base, at adjacent sides 109a-d of the plant container 100. The individual growth substrates 103 are adjacent to the grid panels 106, and cover grid openings 112 to form wall structures 105 that hold soil (not visible in FIG. 1) between the outer frame 102 and an inner frame assembly 120. Each of the growth substrates 103 is exposed and accessible for planting through the grid openings 112.

In various embodiments, the growth substrates 103 can include a combination of fresh sphagnum moss and coir fibers, wetted and compressed into generally planar sheets having a thickness in a range of about 0.5 inch to about 1.5 inches (e.g., 1 inch). The moss and coir fibers can promote a rooting and growing environment for a variety of plant materials 116, such as succulents, sedum, and other plant materials. In particular, the roots of the plant material 116 can take hold through the moss and fibers of the growth substrates 103 and extend to the adjacent soil. In other embodiments, the growth substrate can be other suitable material for providing a rooting and growing environment for plant materials. In one aspect of the technology, the growth substrates 103 can be individually removed from the outer frame and replaced, such as for seasonal or periodic replanting. In another aspect of the technology, the growth substrates 103 allow for planting both vertically through the corresponding grid panels 106 and horizontally through grid openings 113 in an overlying lid frame 114.

The inner frame assembly 120 of one embodiment extends around and defines an interior area configured to receive a removable container 118 that holds a separate planter 119, such as a potted plant. In the illustrated embodiment, the planter 119 is received into a central cavity 143 of the container 118. The planter 119 can be independently installed and removed from the plant container 100 without disturbing the adjacent growth substrates 103 in the outer frame. In another embodiment, the interior area defined by the inner frame assembly 102 or the container 118 can be directly filled with soil for planting rather than receiving the separate planter 119.

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, various elements and features illustrated in the Figures may not be shown to scale.

Figure 2A:
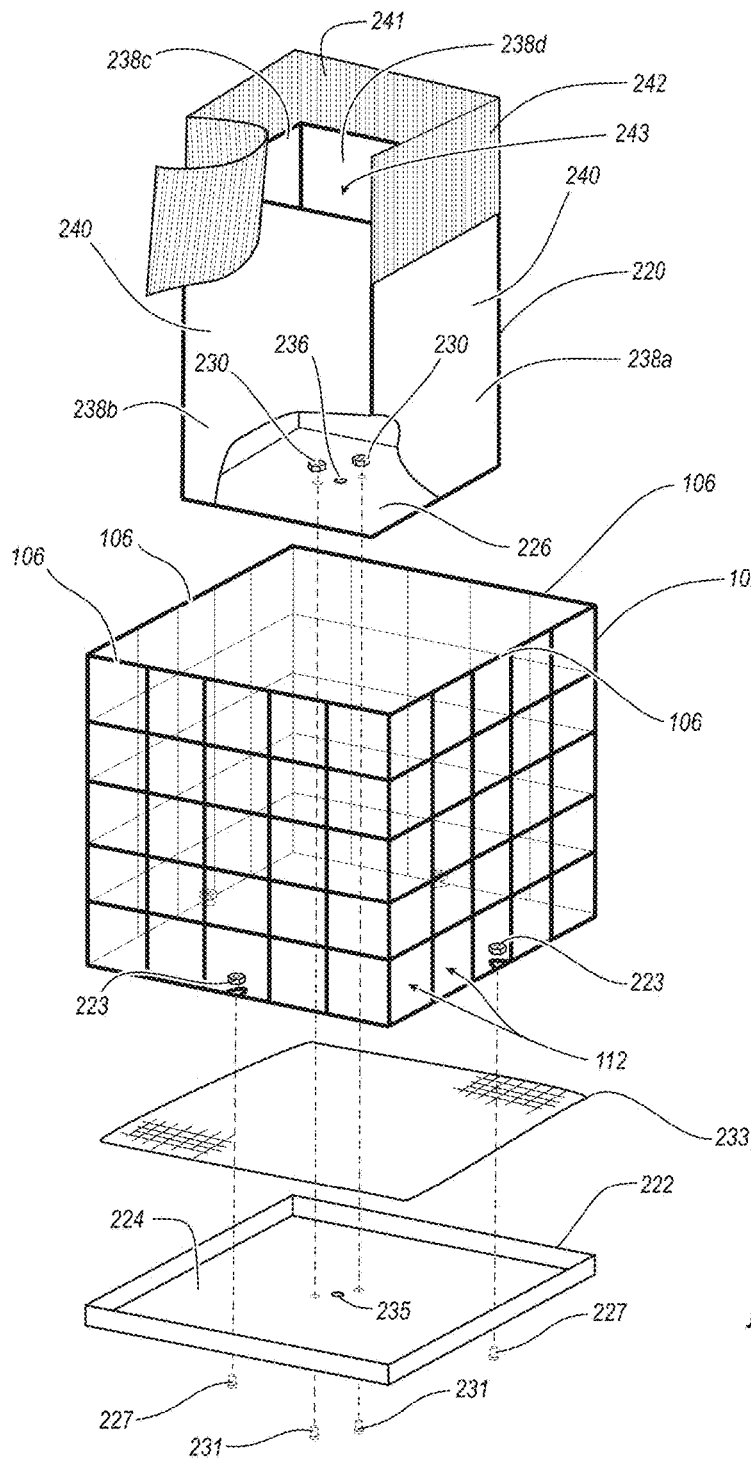
FIGS. 2A-2D are exploded isometric views of an inner frame, an outer frame, and various components of the plant container assembly.

FIGS. 2A-2D are exploded isometric views of an inner form or frame 220 nested within the outer frame 102, and various components of the plant container 100 (FIG. 1) in accordance with one or more embodiments of the present technology. Referring to FIG. 2A, the inner frame 220 is supported on a base 222. The inner frame 220 can be set upon the base 222 or attached to the base 222, such as with fasteners 223 (e.g., bolts) that extend through a surface 224 of the base 222 and a bottom wall 226 of the inner frame 220 and receive locking features 227 (e.g., lock nuts). The open grid outer frame 102 is also supported on the base 222 radially outward of the inner frame 222 to define a receiving space between the inner and outer frames 220 and 102. The outer frame 102 can be attached to the base 222 with fasteners 230 (e.g., bolts) and corresponding locking features 231 (e.g., lock nuts). The surface 224 of the base 222 can be lined with a lower liner 233, such as a mesh or weed barrier fabric. The base 222 and the bottom wall 226 of the inner frame 220 can include holes 235 and 236, respectively, to facilitate drainage. In some embodiments, a silicone adhesive (not shown) can be deposited between the surface 224 of the base 222 and the inner frame's bottom wall 226 to form a moisture barrier and facilitate attachment.

The inner frame 220 includes interconnected, adjacent frame walls 238 (identified individually as first through fourth frame walls 238a-d) that extend generally vertically from the bottom wall 226 and define a central cavity 243. Each of the frame walls 238 has an outer surface 240 that faces a corresponding one of the grid panels 106. An upper liner 242, such as compostable crepe paper, covers a portion of the outer surface 240 near the top side of the inner frame 220. An extended lip 241 of the upper liner 242 can be folded over the upper edges of the frame walls 238 and into the central cavity 243. The inner frame 220 can be constructed from plastic, wood, cardboard, organic materials, or other suitable materials.

The outer frame 102 is an open grid form (e.g., a steel or other metal wire grid) having a square or rectangular planform defined by the grid panels 106. In other embodiments, the outer frame 102 can have other sizes and/or shapes, such as elongate rectangular, triangular, cylindrical, polygonal, or virtually any other suitable geometric shape. In the illustrated embodiment, the grid panel openings 112 can be squares or rectangles that range in size from about 2 inch×2 inch to about 4 inch×4 inch. In other embodiments, the grid openings 112 can have different dimensions and/or different shapes (e.g., circular, hexagonal, or other shapes). In some embodiments, the outer frame 102 can be constructed from plastic, wood, or other materials in addition to or in lieu of metal.

Figure 2B:
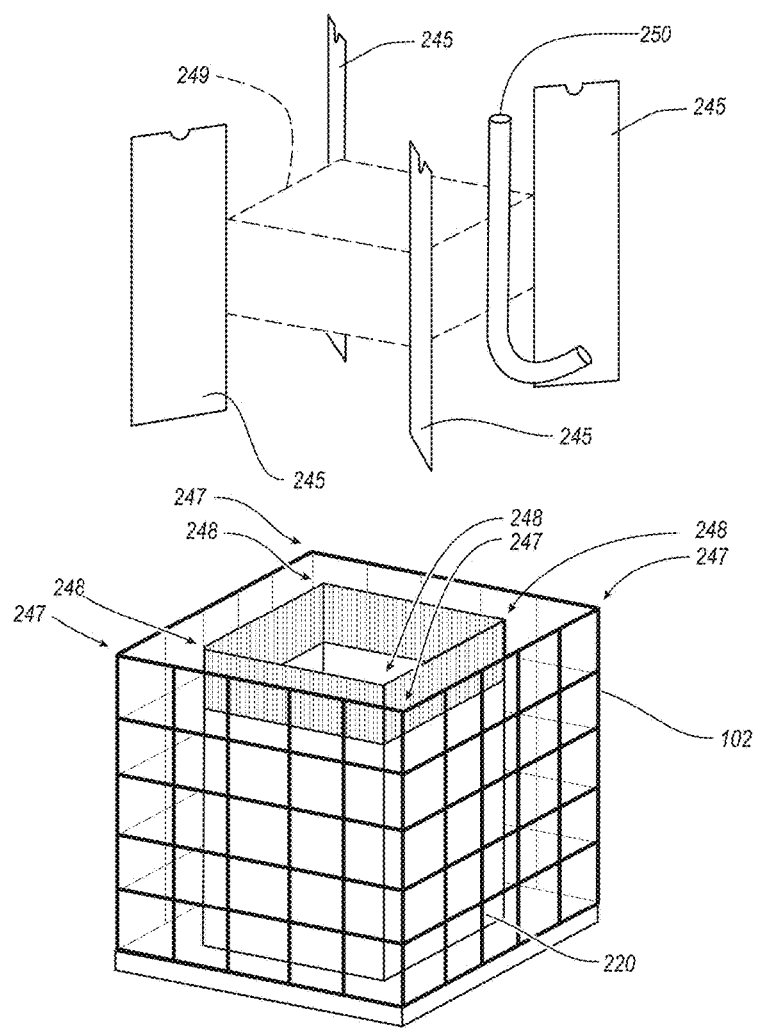

Referring to FIG. 2B, a plurality of divider members 245 (e.g., plastic wings) are positioned in the space between the inner and outer frames 220 and 102. In the illustrated embodiment, the divider members 245 extend between first corner regions 247 of the outer frame 102 and corresponding second corner regions 248 of the inner frame 220 to divide the space into four orthogonally oriented areas. In some embodiments, the divider members 245 can be attached to or integral with an optional sleeve 249 (shown in hidden lines) that fits around the inner frame 220 to facilitate placement and positioning of the divider members 245. In other embodiments, more dividers can be used, and the dividers can be placed in locations at or away from the corner regions 247 and 248 As further shown in FIG. 2B, an irrigation feed tube 250 can be inserted with the divider members 245 into the outer frame 102. In some embodiments, the feed tube 250 can also be attached to the optional sleeve 249.

Figure 2C:
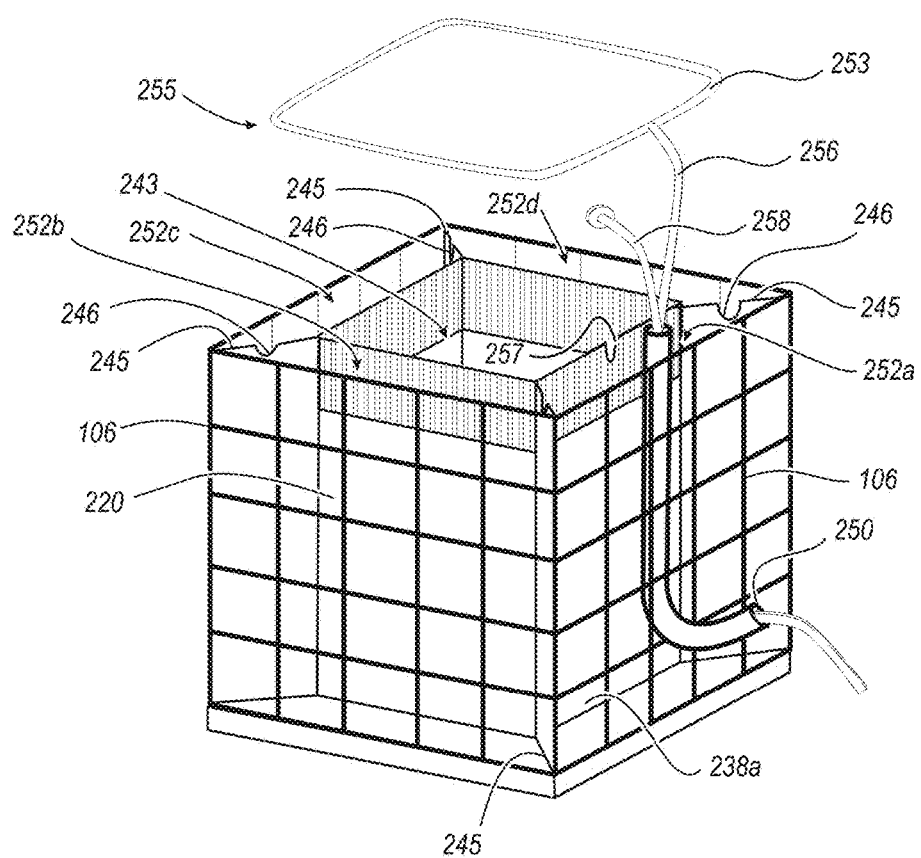

Referring to FIG. 2C, the frame walls 238 and the grid panels 106 define a plurality of discrete slot regions 252 (identified individually as first through fourth slot regions 252a-d) that are separated from one another by the individual divider members 245. Each of the divider members 245 of the illustrated embodiment includes a cut-out 246 toward the top of the corresponding divider member 245 configured to carry a drip ring 253 (e.g., a drip tube) of an irrigation system 255. The drip ring 253 surrounds the inner frame 220 and extends through each of the slot regions 252 toward the top side of the plant container. The drip ring 253 is coupled to a supply tube 256 that extends through the feed tube 250 to connect to a water supply source (not shown). In some embodiments, a separate irrigation tube 258 can be fed to the central cavity 243 to provide water for the planter 119 (FIG. 1). In such embodiments, the frame wall 238a can include a cut out 257 toward the top of the inner frame 220 for receiving the irrigation tube 258.

Figure 2D:
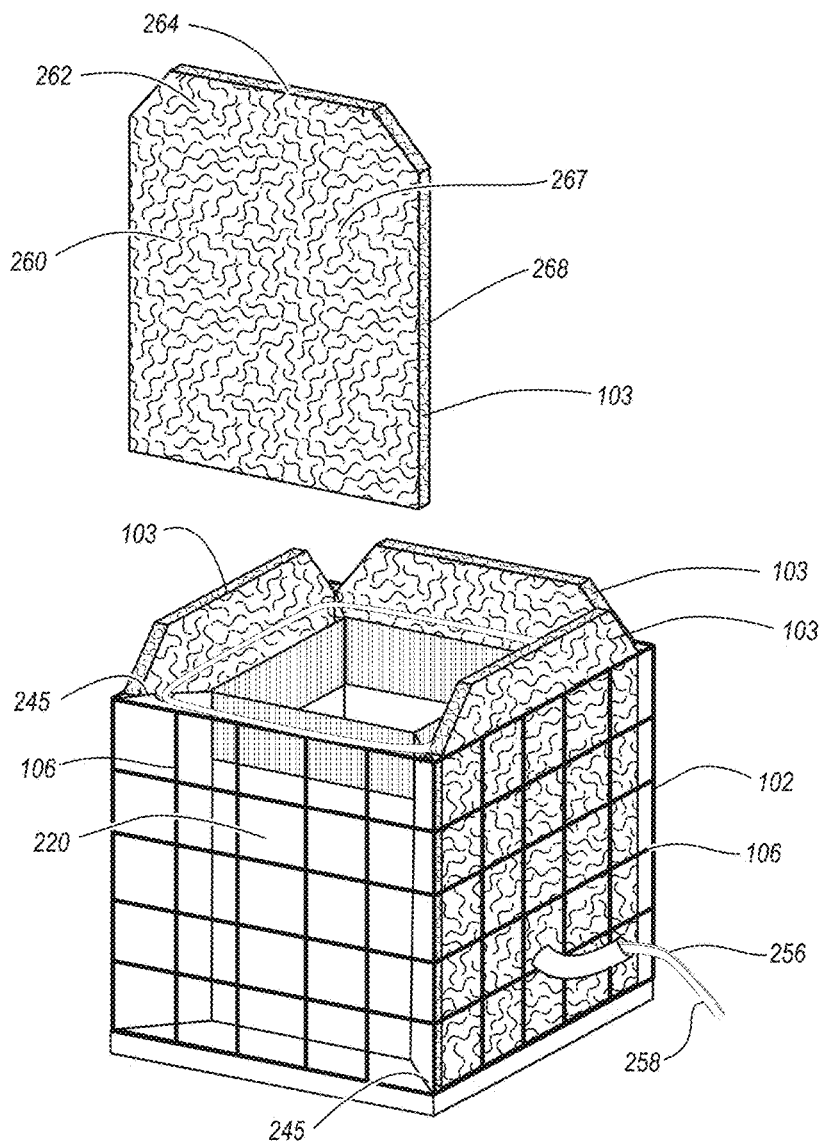

Referring to FIG. 2D, the growth substrates 103 are inserted individually into the corresponding slot regions 252 (FIG. 2C) between the inner and outer frames 220 and 102. Each growth substrate 103 abuts a corresponding one of the grid panels 106 and is snuggly held between a pair of the divider members 245 located at opposite sides of the growth substrate 103. Each growth substrate 103 includes a generally planar portion 260 that inserts into the slot regions 252, and can include a foldable projection 262 that projects from the planar portion 260. The projection 262 extends upwardly beyond the slot region 252 and has a tapered outer edge 264. As described below, each of the growth substrates 103 has an outer first side 267 facing radially outwardly and exposed through a corresponding one of the grid panels 106 for planting, and an inner second side 268 facing toward the inner frame 220. In one embodiment, additional soil can be provided in the space between the grid panels' second sides 268 and the inner frame 220 (FIG. 2C). As further shown in FIG. 2D, the irrigation feed tube 250 can be punched through the material of one of the growth substrates 103 to feed the supply tube 256 and the optional irrigation tube 258 into the interior area of the plant container.

Figure 3A:
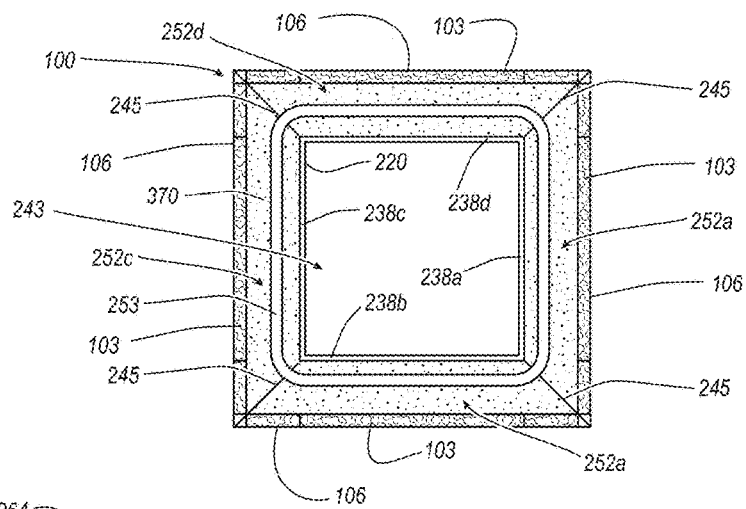
FIG. 3A is a top view.
Figure 3B:
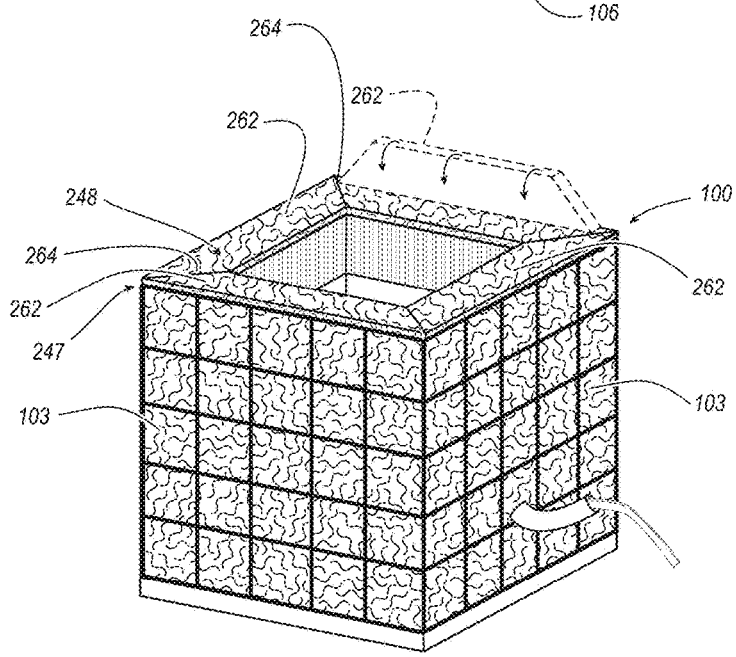
FIG. 3B is an isometric view of the plant container assembly showing growth substrates of the assembly and soil that has been deposited between the growth substrates and the inner frame.

FIG. 3A is a top view, and FIG. 3B is an isometric view of the plant container 100 showing the growth substrates 103 installed in the slot regions 252, and soil 370 (FIG. 3A) deposited in the slot regions 252 between the growth substrates 103 and the inner frame 220. Referring to FIG. 3B, the projection 262 of each growth substrate 103 is folded inwardly and over the slot region. The tapered edge 264 of the projection 262 is angled such that it abuts the tapered edge of an adjacent growth substrate near the corner regions 247 and 248. While the projection 262 of growth substrate 103 in the illustrated embodiment can be folded over, such as atop soil, in other embodiments the projection 262 can cut off or otherwise removed and discarded at the discretion of the user.

Referring Figure to 3A, before folding the projections 262, the drip ring 253 and the optional irrigation tube 258 (FIG. 2C) are positioned over the divider members 245 and the soil 370. The soil 370 can be watered and allowed to settle. In some embodiments, the upper liner 242 (FIG. 2A) remains extended and is not folded over the frame walls 238 until after the soil 370 has been deposited. The extended lip 241 (FIG. 2A) can prevent loose soil from spilling over into the central cavity 243 of the inner frame 220.

Figure 4:
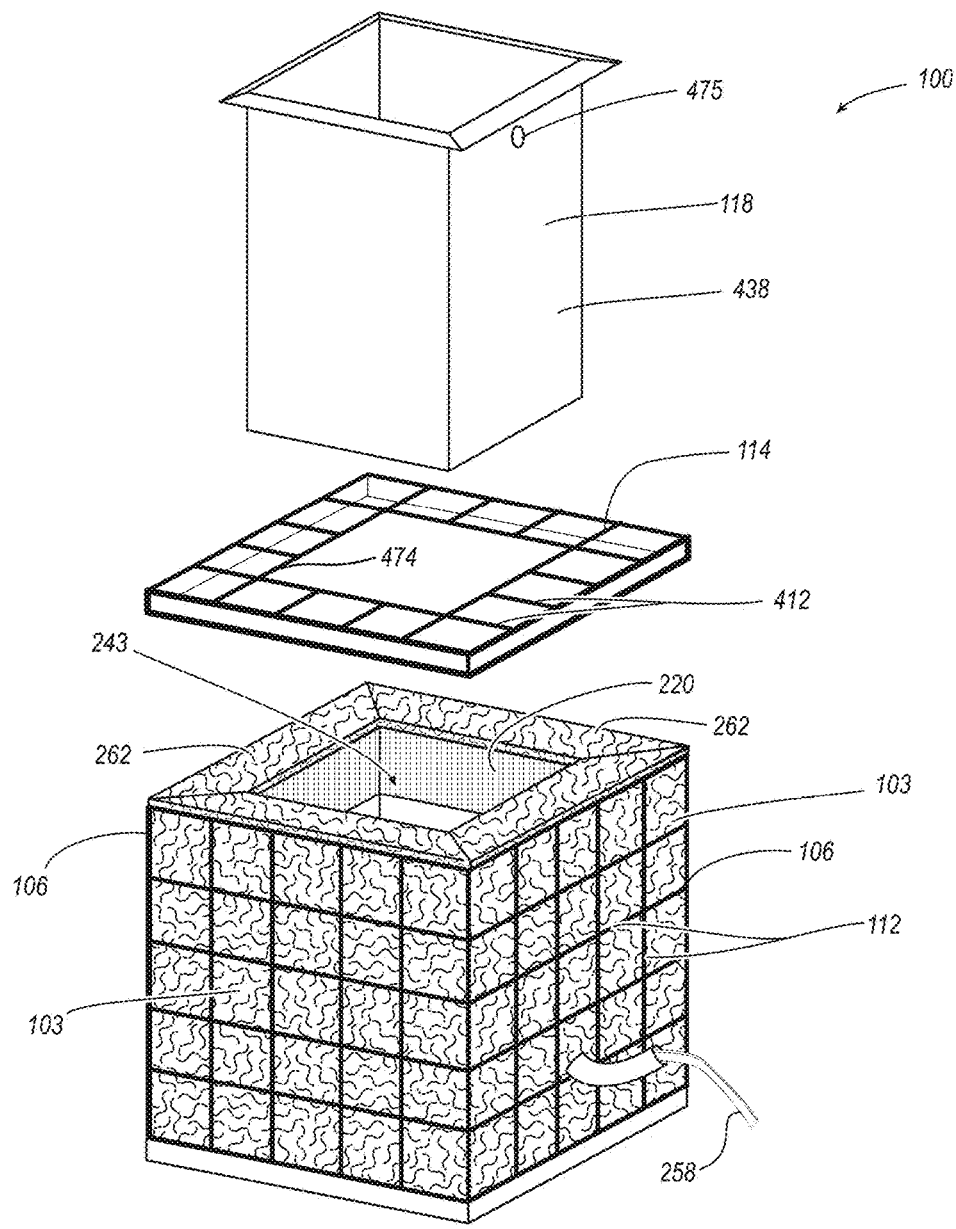
FIG. 4 is an exploded isometric view of the plant container assembly showing a container structure installed in the inner frame.

FIG. 4 is an exploded isometric view of the container 118 inserted into the central cavity 243 of the inner frame 220. In the embodiment illustrated in FIG. 4, the lid frame 114 is placed over the grid panels 106 and the folded projections 262 of the growth substrates 103. The lid 114 includes a central opening 474 that receives the removable container 118. The lid 114 can be a grid panel (e.g., a metal wire grid) with grid openings 412 that are generally similar to the grid openings 112 of the grid panels 106. The container 118 can include a hole 475 through a sidewall 438 for receiving the irrigation tube 258 when the container 118 is seated in the central cavity 243.

Figure 5:
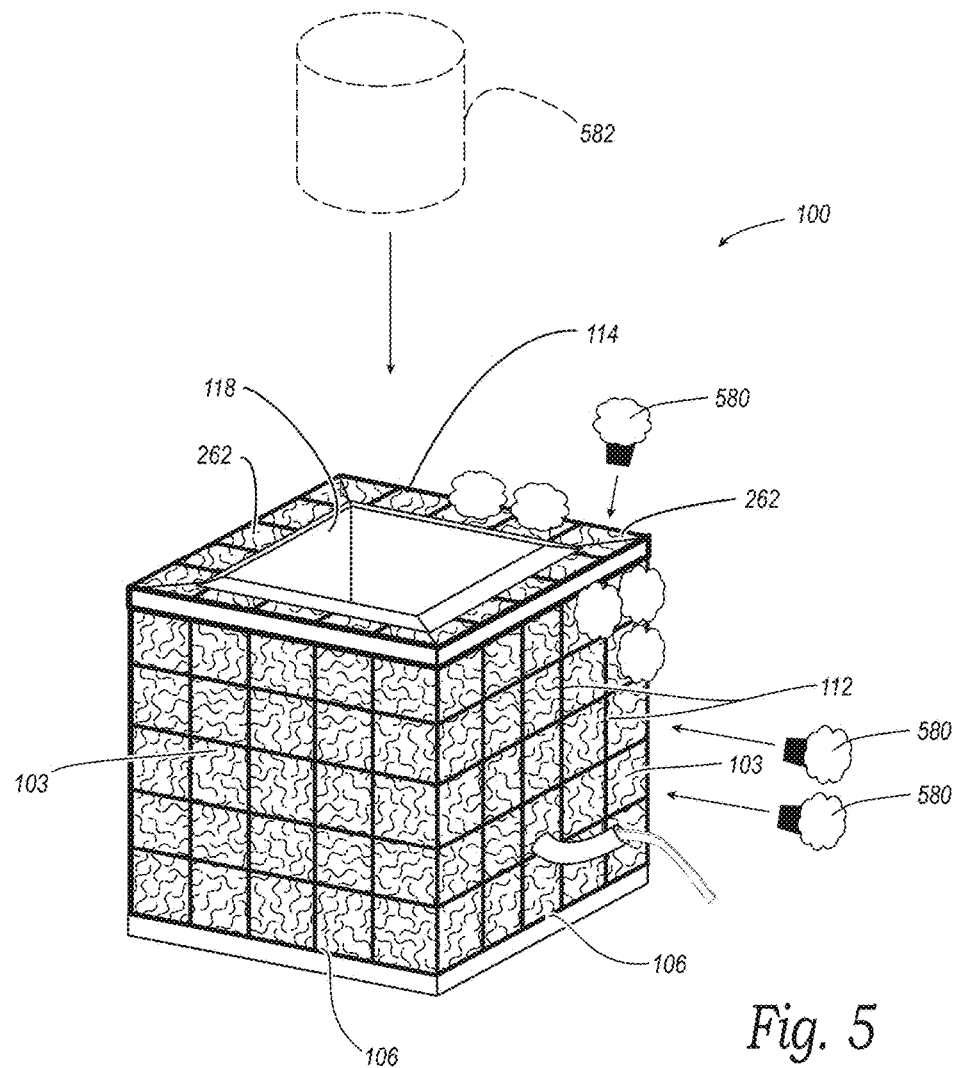
FIG. 5 is an isometric view of the plant container assembly with plant plugs planted in the growth substrates.

FIG. 5 is an isometric view of the plant container 100 with plant plugs 580 planted into the surface of the exposed growth substrates 103 through the corresponding grid openings 112. In some embodiments, the growth substrates 103 can be cut or perforated to form holes or penetrations (not shown) that receive the plant plugs 580 and facilitate establishment of plant roots in the corresponding growth substrate 103 and/or the soil 370 (FIG. 3A). In these and other embodiments, seeds and/or seedlings can be directly planted into the growth substrate 103.

In the embodiment illustrated in FIG. 5, plant material is planted vertically into the growth substrates 103 through the grid openings 112 in the grid panels 106 and horizontally into the folded projections 262 of the growth substrates 103 beneath lid frame 114. The horizontally planted material surrounds the container 118 which holds the planter 119 (FIG. 1). In various embodiments, the container 118 can hold objects and fixtures other than the planter or plants. For example, the removable container can be a receptacle for holding garden tools, compost, refuse, or other items. In addition or alternately, other fixtures can be seated or installed in the central cavity, such as a light fixture 582 (shown schematically).

Figure 6:
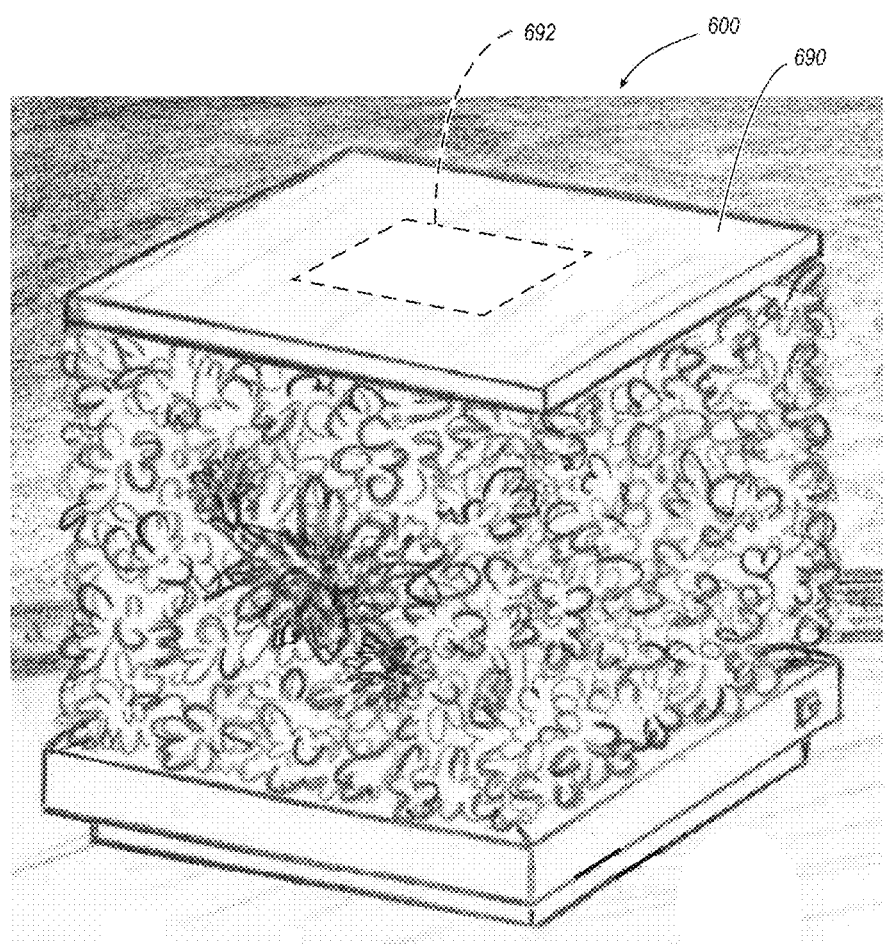
FIG. 6 is an isometric view of a plant container assembly configured in accordance with another embodiment of the technology.

FIG. 6 is an isometric view of a plant container assembly 600 ("plant container 600") configured in accordance with another embodiment. The plant container 600 can be generally similar to the plant container 500 described above; however, a table top 690 (e.g., a wood tabletop) is placed over the grid panels (not visible in FIG. 6) in lieu of the open-grid lid 114 (FIG. 1). In some embodiments, a glass table top or a table top having a transparent or translucent portion 692 (shown in hidden lines) can be placed over the grid panels. In these embodiments, the light fixture 582 (FIG. 5) can be configured to emit light through the transparent or translucent material to form a lighted table top.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

I claim:

1. A plant container assembly, comprising:
    a base;
    an inner frame on the base;
    an outer frame having a plurality of grid panels projecting from the base, surrounding the inner frame, and defining a plurality of slot regions between the inner frame and the grid panels; and
    a plurality of growth substrates received into the slot regions, wherein each of the growth substrates has a first side that is exposed through one of the grid panels for planting, and a second side configured to hold soil within a corresponding one of the slot regions.

2. The plant container assembly of claim 1 wherein each of the growth substrates comprises sphagnum moss and coir fibers compressed with the sphagnum moss into a continuous sheet of material.

3. The plant container assembly of claim 2 wherein the inner frame has a central cavity, and wherein the plant container assembly further comprises a container received into the central cavity.

4. The plant container assembly of claim 1 wherein:
    the outer frame has a rectangular planform; and
    inner frame has a rectangular planform nested within the planform of the outer frame.

5. The plant container assembly of claim 1, further comprising a plurality of divider members extending outwardly from the inner frame and configured to hold the growth substrates within each of the corresponding slot regions.

6. The plant container assembly of claim 5, further comprising a drip tube surrounding the inner frame, wherein each of the divider members includes a slot configured to carry a portion of the drip tube.

7. The plant container assembly of claim 6 wherein the sheet of material has a projection that projects from the planar portion and is configured to fold over a corresponding one of the slot regions.

8. The plant container assembly of claim 1 wherein each of the growth substrates comprises sphagnum moss and coir fibers compressed with the sphagnum moss into a continuous sheet of material having a planar portion that inserts into a corresponding one of the slot regions.

9. The plant container assembly of claim 1 further comprising a lid extending over the outer frame, wherein the lid comprises an open grid, and wherein each of the growth substrates is accessible through the open grid for planting.

10. A plant container assembly, comprising:
    a base;
    an open grid structure on the base;
    an inner form nested within the open grid structure; and
    a plurality of growth substrates within the open grid structure and surrounding the inner form, wherein each of the growth substrates is configured to hold soil between the open grid structure and the inner form.

11. The plant container assembly of claim 10, further comprising a lid extending over the open grid structure, wherein each of the growth substrates includes a planar portion for holding the soil and a folded portion for covering the soil beneath the lid.

12. The plant container assembly of claim 11, further comprising a plurality of divider members extending outwardly from the inner form and defining separate slot regions that receive the soil.

13. The plant container assembly of claim 10, further comprising a table top extending over the open grid structure.

14. The plant container assembly of claim 10, further comprising a light fixture seated within the inner form.

15. The plant container assembly of claim 14, further comprising a tabletop extending over the open grid structure and the light fixture, wherein the table top comprises a transparent or translucent material through which the light fixture emits light.

16. A method for making a plant container assembly, the method comprising:
    positioning an outer frame having a grid panel on a base;
    nesting an inner frame within the outer frame to form a slot region; and
    inserting a growth substrate into the slot region to hold soil between the inner and outer frame, wherein the growth substrate is accessible through the grid panel, wherein the growth substrate comprises sphagnum moss and coir fibers compressed with the sphagnum moss into a continuous sheet of material.

17. The method of claim 16 further comprising folding the sheet of material to cover the soil in the slot region.

18. A method for making a plant container assembly, the method comprising:
    positioning an outer frame having a grid panel on a base;
    nesting an inner frame within the outer frame to form a slot region;
    inserting a growth substrate into the slot region to hold soil between the inner and outer frame, wherein the growth substrate is accessible through the grid panel; and
    positioning a container in a central cavity defined by the inner frame.

19. A method for making a plant container assembly, the method comprising:
    positioning an outer frame having a grid panel on a base;
    nesting an inner frame within the outer frame to form a slot region;
    inserting a growth substrate into the slot region to hold soil between the inner and outer frame, wherein the growth substrate is accessible through the grid panel; and inserting divider members between corner regions of the inner and outer frames to hold the growth substrate within the slot region.

\* \* \* \* \*